US007116770B1

(12) United States Patent
Tran et al.

(10) Patent No.: US 7,116,770 B1
(45) Date of Patent: Oct. 3, 2006

(54) COMMUNICATION NETWORK MANAGEMENT

(75) Inventors: Thanh Tran, San Jose, CA (US); Hung B. Nguyen, Milpitas, CA (US); Frederick Kull, Campbell, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/382,553

(22) Filed: Aug. 25, 1999

(51) Int. Cl.
*H04M 3/42* (2006.01)
*H04M 1/64* (2006.01)

(52) U.S. Cl. .............................. 379/201.01; 379/88.22; 379/207.02; 379/207.12; 379/214.01

(58) Field of Classification Search ........... 379/207.02, 379/207.12, 214.01, 88.22, 201.01
See application file for complete search history.

(56) References Cited

U.S. PATENT DOCUMENTS

| | | | | |
|---|---|---|---|---|
| 4,602,129 A | * | 7/1986 | Matthews et al. | 379/214.01 |
| 4,646,346 A | * | 2/1987 | Emerson et al. | 379/214.01 |
| 4,754,479 A | * | 6/1988 | Bicknell et al. | 379/207.12 |
| 4,933,967 A | * | 6/1990 | Lo et al. | 379/207.02 |
| 5,261,044 A | | 11/1993 | Dev et al. | 395/159 |
| 5,724,406 A | | 3/1998 | Juster | |
| 5,752,245 A | | 5/1998 | Parrish et al. | 707/10 |
| 5,774,689 A | | 6/1998 | Curtis et al. | 395/500 |
| 5,832,503 A | | 11/1998 | Malik et al. | 707/104 |
| 5,845,090 A | | 12/1998 | Collins, III et al. | 395/200.51 |
| 5,884,022 A | | 3/1999 | Callsen et al. | 395/182.22 |
| 5,903,731 A | | 5/1999 | Vincent et al. | |

FOREIGN PATENT DOCUMENTS

WO  WO 97/31451 A1  8/1997
WO  WO 99/34557 A1  7/1999

OTHER PUBLICATIONS

Rizzetto D. et al. "A Voice Over IP Service Architecture for Integrated Communications", IEEE Network, IEEE Inc., New York, US, vol. 13, No. 3 May 1999, pp. 34-40, XP-000870629.

* cited by examiner

*Primary Examiner*—Wing Chan
*Assistant Examiner*—Thjuan P. Knowlin

(57) ABSTRACT

A communication network and an associated network manager server according to the invention includes one or more instances of a first object type and one or more instances of a second object type. The first object type is associated with a first product of the communication network such as a PBX and the second object type is associated with a second product of the network such as a phone mail product. The network includes a first local module for configuring each instance of the first object type and a second local module for configuring each instance of the second object type. A network management server of the network includes a product specific coordinator. The product specific coordinator includes means for coordinating configuration activities among each instance of the first object type via the first local module and means for coordinating configuration activities among each instance of the second object type via the second local module. The network further includes a network coordinator adapted for configuring each instance of a network object, such as a person object that includes a PBX component and a phone mail component. The network object includes a first component associated with the first object type and a second component associated with the second object type. The communication network further includes a network management client that includes a graphical user interface adapted for enabling a user to invoke the network management server.

39 Claims, 4 Drawing Sheets

COMMUNICATION NETWORK MANAGEMENT

BACKGROUND OF THE INVENTION

1. Field of the Invention

The present invention relates to the field of telecommunications and, in particular, to a system for managing a telecommunications network.

2. Description of the Related Art

Telephony based communication networks typically include a variety of components or products that combine to provide communication services to multiple users. Traditionally, these networks utilize dedicated application programs for each of the network components to control configuration and management of the corresponding components. Dedicated PBX and phone mail applications, as examples, have provided the traditional method of managing a communication network that includes a PBX component and a phone mail component. Unfortunately, the performance of such systems during execution of routine system management tasks such as move, add, and change tasks is frequently unacceptable to the end user. As an example, when a user of the communication network moves within an organization, the various components of the network must be updated to reflect the user's new location. While traditional configuration and management applications are adequate to control a specific product or component, they are typically poorly adapted to recognize and manage relationships between the various components of the network. A conventional network might, for example, represent a user by copying all of the phone data and all of the phone mail data for the person to a distinct user entity. It will be appreciated that such an approach contemplates a significant and undesirable duplication of data. In addition, the traditional approach to managing communication networks frequently lacks sufficient flexibility to smoothly integrate new products or components into the network. Systems designed around a finite number of defined component types must typically undergo substantial revision to encompass a new product thereby slowing the introduction of new features and raising the cost of maintaining the network. Therefore it would be highly desirable to implement a communication network with improved performance and flexibility. It would be still further desirable if the implemented solution utilized existing protocols and architectures to the extent possible and took advantage of relationships between various components to model network features in an efficient manner.

SUMMARY OF THE INVENTION

Broadly speaking, the present invention contemplates a communication network and an associated network manager server. The network includes one or more instances of a first object type and one or more instances of a second object type. The first object type is associated with a first product of the communication network and the second object type is associated with a second product of the network. The network includes a first local module or other means for configuring each instance of the first object type and a second local module for configuring each instance of the second object type. A network management server of the network includes a product specific coordinator. The product specific coordinator includes means for coordinating configuration activities among each instance of the first object type via the first local module and means for coordinating configuration activities among each instance of the second object type via the second local module. The network further includes a network coordinator adapted for configuring each instance of a network object. The network object includes a first component associated with the first object type and a second component associated with the second object type. A suitable network object might include, as an example, a person object that includes a PBX component and a phone mail component. The communication network further includes a network management client that includes a graphical user interface adapted for enabling a user to invoke the network management server.

In one embodiment, the first object type is a phone mail object and the first local module comprises a phone mail server process while the second object type is a PBX object and the second local means comprises a PBX server process. In the preferred embodiment, the communication network of claim includes a CORBA compliant interface between the product specific coordinator and the first local module. The network coordinator is preferably adapted for accessing network object data from an LDAP compliant directory server. The network preferably further includes a first LDAP compliant bridge for uploading first object type data from each instance of the first object type to the directory server and a second LDAP compliant bridge application for uploading second object type data from each instance of the second object type to the directory server.

The invention further contemplates a method of managing a communication network. The method includes identifying the components of a network object in response to a network configuration request. A first local configuration module or application is then invoked to configure a first component of the network object and a second local configuration application invoked to configure a second component of the network object. The step of identifying the components is preferably accomplished by accessing object data from an LDAP compliant directory server. The configuring of the first component comprises is accomplished in one embodiment by configuring a PBX object of the communication network and includes taking an action such as removing, adding, and changing the first component while the configuring of the second component comprises configuring a phone mail object of the communication network.

BRIEF DESCRIPTION OF THE DRAWINGS

A better understanding of the invention is obtained when the following detailed description is considered in conjunction with the following drawings in which.

DETAILED DESCRIPTION OF THE INVENTION

Figure 1:
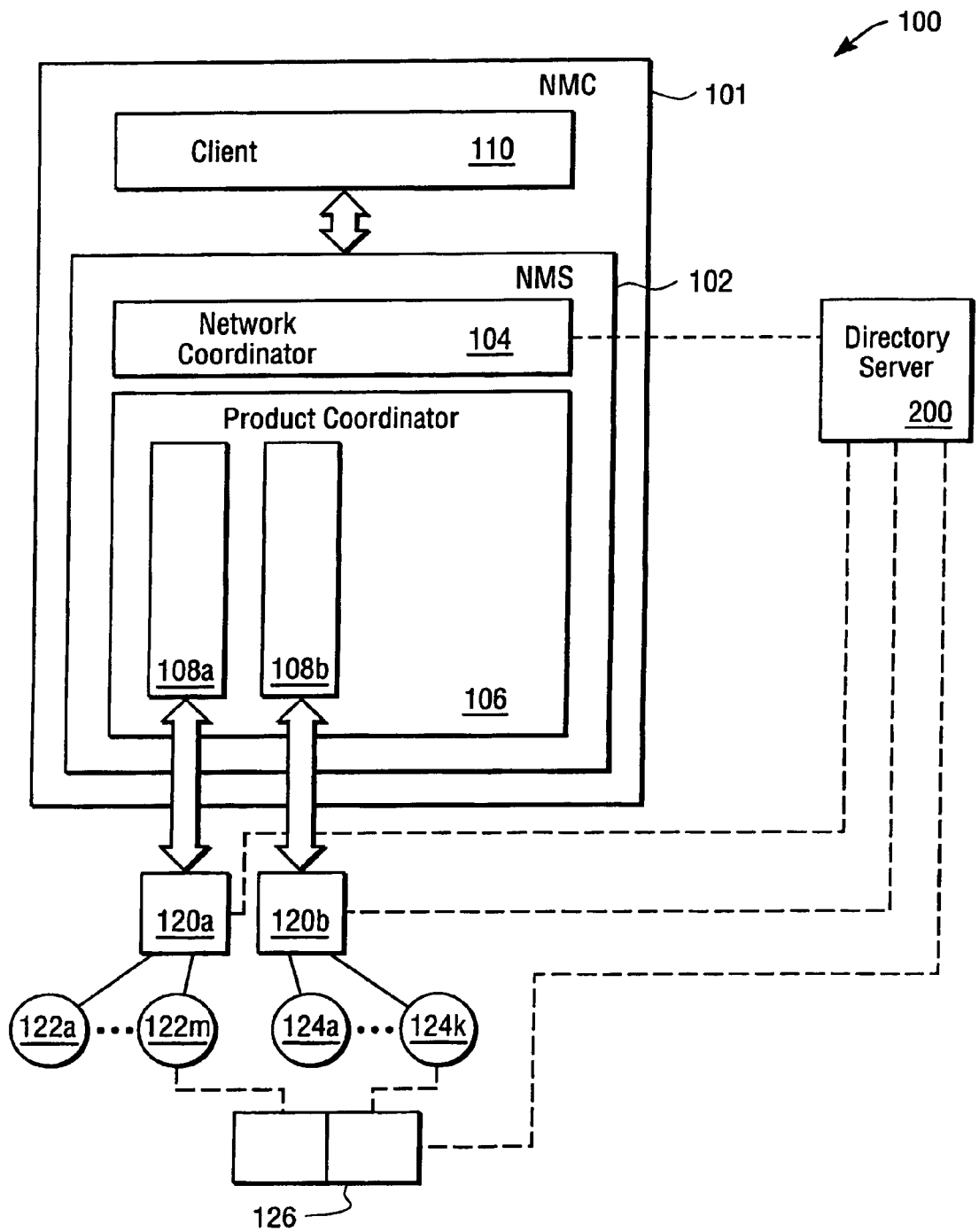
FIG. 1 is a simplified block diagram of a communication network according to one embodiment of the invention.

Referring to FIG. 1, an exemplary embodiment of a communication network according to the present invention is generally identified with by reference numeral 100. Communication network 100 preferably includes one or more communication devices or product types including, as examples, PBX's and phone mail systems. Each product type within communication network 100 is represented or modeled in software by an object type as will be familiar to those skilled in the field of object oriented programming languages. As depicted in FIG. 1, network 100 includes one or multiple instances of a first object type 122a . . . 122m (generically or collectively referred to as first object type 122) and one or multiple instances of a second object type 124a . . . 124k (generically or collectively referred to as second object type 124). Local configuration software for each product type provides the means for administering each instance of the corresponding product type. Exemplary local configuration software is the LC Win software available from Siemens Corp. Accordingly, computer system 100 as depicted in FIG. 1 includes first local configuration software 120a and second local configuration software 120b. Additional instances of local configuration software maybe included for each additional communication product included in network 100.

The services for administering the different products comprising communication system 100 are used or invoked by network management server 102. Network management server (NMS) 102 provides the core functionality for the network management-configuration module (NMC) 101. NMC 101 enables a user to control all network and local configuration activities from a single point of entry. NMS 102 preferably includes a configuration model of network 100 embedded with information sufficient to enable NMS 102 to administer the entire domain. NMS 102 provides the framework for configuration of all supported product types. As indicated in FIG. 1, NMS 102 is comprised of two major layers, namely, a product specific coordinator 106 and a network coordinator 104. Product specific coordinator 106 is adapted for coordinating configuration activities between different instances of a specified product line within a domain. As an example, the detailed coordination of moving a phone within a PBX or from one PBX to another is handled by a product specific PBX coordinator. Product specific coordinator 106 comprises a set of modules 108a, 108b . . . (collectively referred to as modules 108) corresponding to each product type within network 100. The set of modules 108 provide means for invoking or using the operations supplied by corresponding instances of local configuration modules 120. In other words, product specific coordinator 106 is the client for local configuration modules 120.

Figure 3:
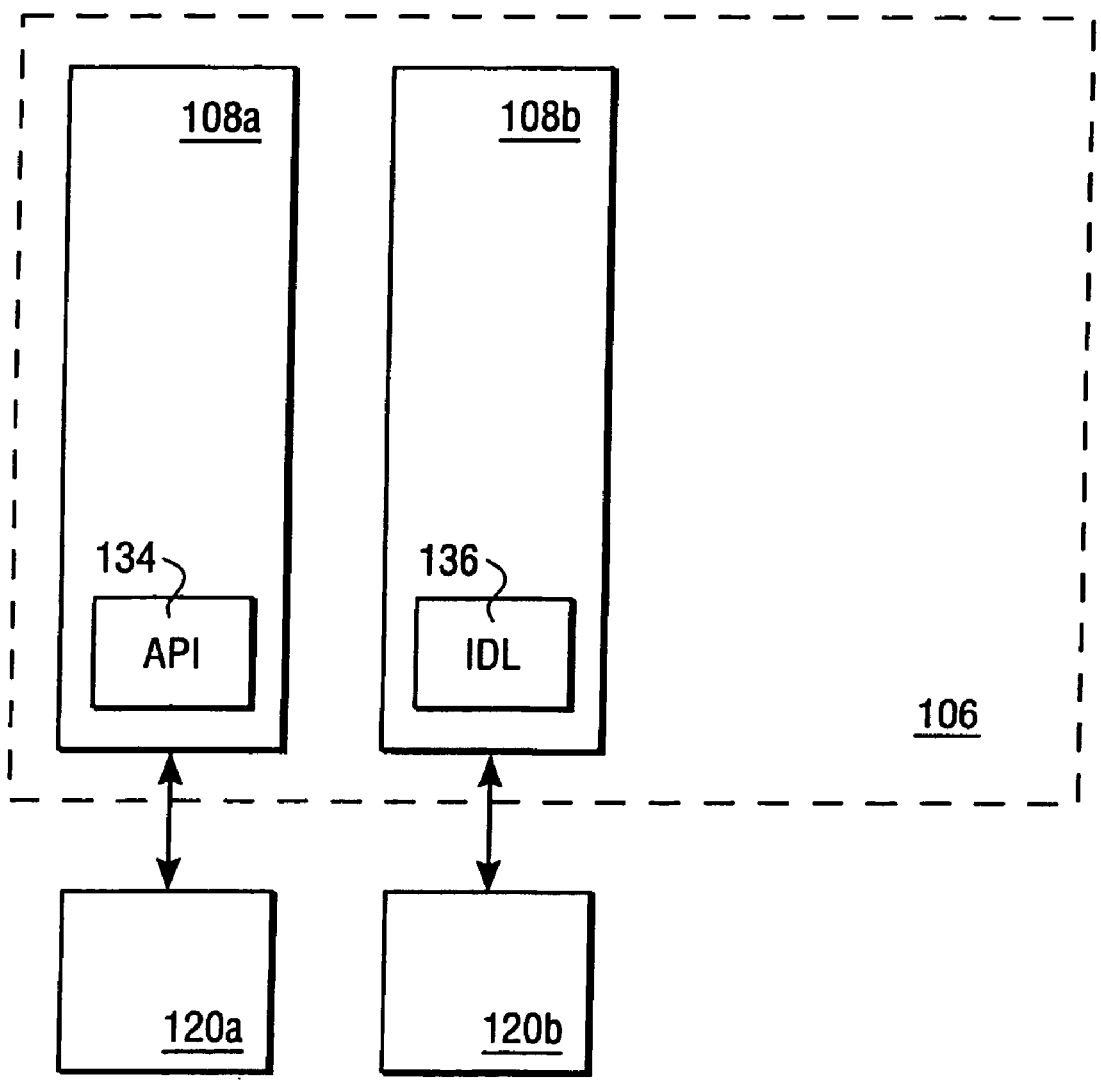
FIG. 3 is a simplified representation of one embodiment of a product specific coordinator of a network management server according to the invention.

Referring briefly to FIG. 3, an embodiment of product specific coordinator 106 is presented including a first product specific module 108a adapted for accessing the functionality of a first local configuration module 120a and a second product specific module 108b adapted for invoking a second local configuration module 120b. Product specific modules 108 may utilize a proprietary application programming interface (API) or a standard interface such as a common object request broker architecture (CORBA) compliant interface definition language (IDL) to communicate with their corresponding local configuration modules 120. For the example depicted in FIG. 3, first product specific module 108a invokes first local configuration module 120a using API 134 while second product specific module 108b communicates with second local configuration module 120b via CORBA IDL 136.

Returning now to FIG. 1, network coordinator 104 is adapted for coordinating configuration activities across different product types while using product specific coordinator 106 to handle specific information relating to each managed product. Network coordinator 104 is primarily responsible for managing network objects including objects comprised of two or more product components. In the context of communication network 100, for example, a network object in the form of a person object might comprise a phone (that is part of a PBX object) and a phone mail box that is part of a phone mail object. Network coordinator 104 is designed to ensure that each of the components of the network object are properly accounted for when a network object is managed. If, as an example, a person object is deleted from the domain managed by NMC 101, network coordinator 104 insures that all components of the person object in all nodes within the domain are removed.

The removal of a person object from network 100 in one embodiment would be accomplished as follows. Network coordinator 104 would first identify the components of the person object. Upon identifying a phone component that is part of a PBX object, network coordinator will initiate a "delete" operation to a PBX module identified for purposes of this example as first product specific module 108a of product specific coordinator 106. PBX module 108a then proceeds with the delete request from network coordinator 104 by invoking an API or CORBA IDL interface to the corresponding PBX local configuration module identified for purposes of this example by first local configuration module 120a. PBX module 108a will then update all dial plans for all PBX units 122 within the network domain after receiving confirmation from PBX local configuration module 120a that the delete request was completed successfully. When PBX module 108a has completed its update, network coordinator 104 will identify the phone mail component of the person object and proceed with a delete procedure by issuing a delete operation to a phone mail module identified for purposes of this example as second product specific module 108b. Phone mail module 108b will then invoke its corresponding local configuration module 120b to delete the appropriate phone mail box from network 100. Phone mail local configuration module 120b will then inform network coordinator 104 when it has completed the requested operation.

Figure 2:
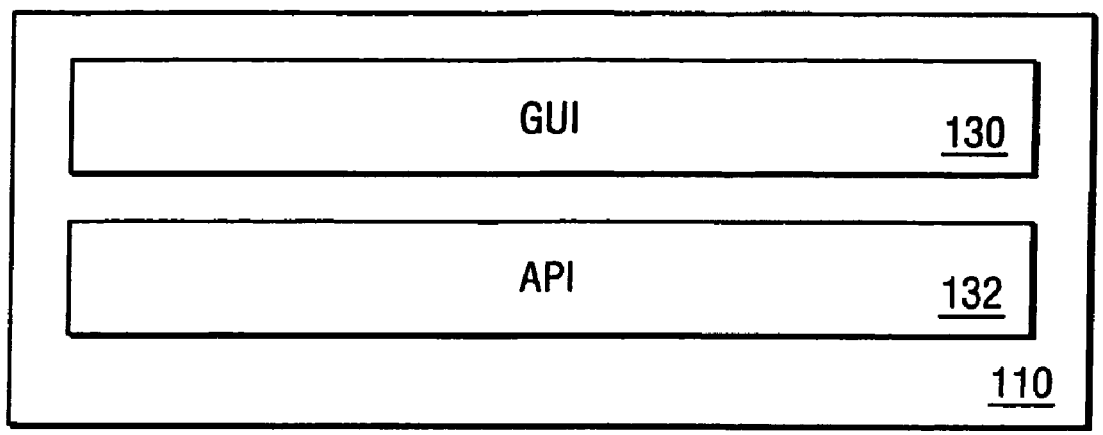
FIG. 2 is a simplified representation of a network management client according the one embodiment of the invention.

Network management server 102 is invoked in the preferred embodiment through network management client 110. Referring to FIG. 2, the depicted embodiment of network management client 110 includes two primary layers, namely, graphical user interface layer 130 and a proprietary API layer 132. The GUI layer 130 is adapted to handle manipulation of a display screen to provide a user of NMC 101 with a useable interface for invoking operations and requests to NMS 102. API layer 132 is configured to pack and unpack NMC commands between GUI layer 130 and NMS 102. Communication between network management client 110 and NMS 102 is preferably achieved using meta-data based commands for carrying object data between network management client 110 and NMS 102. In an alternative embodiment, a CORBA compliant object request broker (ORB) will be used to handle requests between NM Client 110 and NM server 102 in lieu of API layer 132.

In the preferred embodiment of NMC 101, all administrative entities in the managed network or domain are referred to as network managed objects. A network managed object is defined for purposes of this invention as an entry with a unique identification on which administrative actions such as, add, move, delete, and query can be performed. As diagrammed in FIG. 4, the preferred embodiment of NMC 101 contemplates two categories of network managed objects, network entry objects and product entry objects 150. Each network entry object 140 is a representation of a composite object that includes components residing in one or more nodes of the domain. In the preferred embodiment, network entry objects 140 retrieve their data from a directory server type application. Object data for network entry objects 140 is comprised of relevant data from all the components that make up network entry object 140. Network entry objects 140 capture the relationship between the various local components. A first type of network entry object is a person object 141 referred to previously. Person object 141 preferably includes multiple components from various communication product types. As an example, a first component of person object 141 as depicted in FIG. 5 may be a phone 163 associated with a PBX object type 161 while a second component may comprise a phone mail box associated with a phone mail object 162. Additional components (not depicted in FIG. 5) of person object 141 may includes a CCMS agent with an agent identification or an IP address for an internet voice phone application. A network entry object 140 requires at least one component residing in one of the network systems or nodes, but it is not strictly required that each example of network entry object 140 include a component associated with each product type. Returning to FIG. 4, a second type of network entry object 140 is represented by resource object 142. An example of a resource object 142 is the trunk object represented in FIG. 4 by reference numeral 143. A trunk resource suitable for connecting two PBX systems is modeled in NMC 101 as a pair of end points residing in the respective PBX systems connected by the trunk. NM server 102 is adapted to configure trunk object 143 by configuring the two trunk resource end points. Trunk object 143 may be reconfigured, as an example, by moving one of the trunk resource end points to a different PBX system. Another example of a network resource is a bus connecting a system on which a phone mail server process resides and a PBX system. Similar to the trunk resource, a model of this bus resource includes the pair of end point addresses corresponding to the phone mail system and the PBX system respectively. In the preferred embodiment, resource objects will retrieve their data from a directory server application and will each have a unique identification from the directory server and the components that comprise the resource object will include the addresses of the end points that define the resource object.

Figure 4:
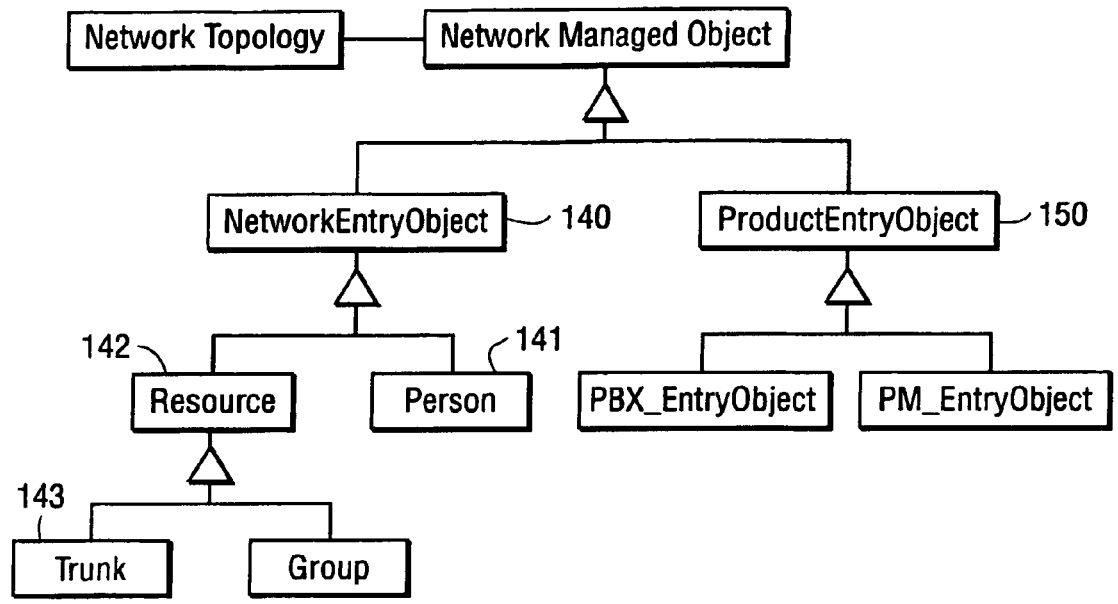
FIG. 4 is a hierarchical diagram of various objects of the invention.
Figure 5:
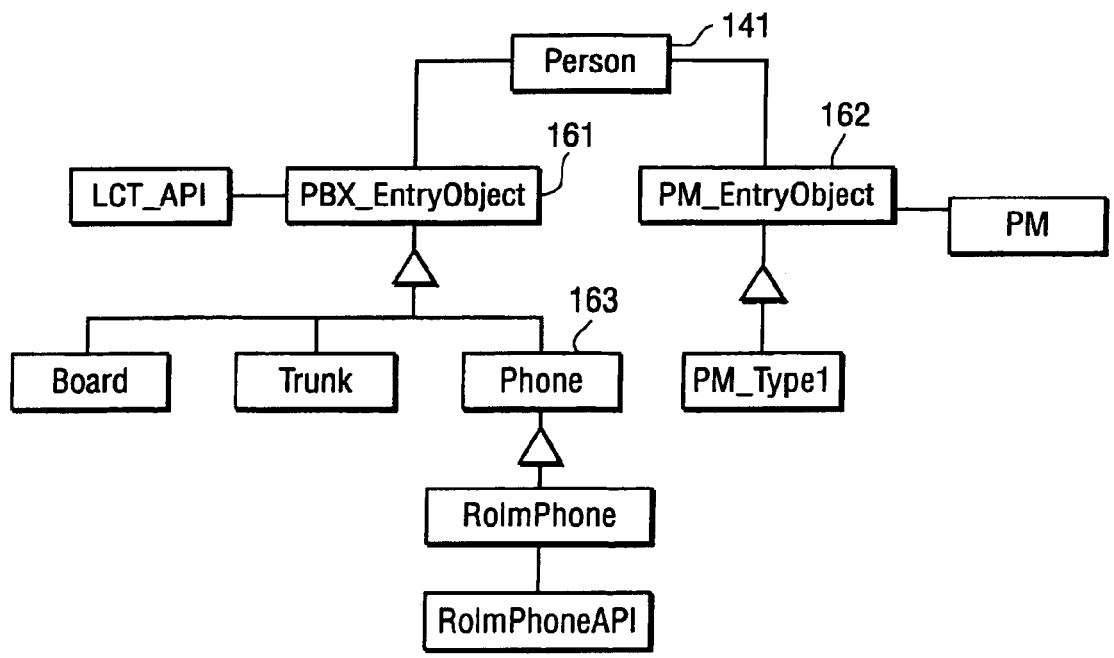
FIG. 5 is a diagram of a person object according to one embodiment of the invention.

FIG. 4 further depicts a product entry object represented by reference numeral 150. Each product entry object 150 is a representation of a local object managed by NMC 101. Each product entry object can be presented as a component to a network entry object 140 such as when, for example, a phone object is presented to a person object. In the preferred embodiment, relevant product entry object data will be uploaded to a directory server application as a component of the network entry object data. Suitable product entry objects for a phone mail system could include, for example, a mail box profile object and a class of service object. While some product entry objects 150 comprise a component of a corresponding network entry object 140, it is preferably not required that each product entry object 150 be a component of a network entry object 140. A peripheral board of a PBX system, for example, might comprise a product entry object not associated with any corresponding network entry object.

In suitable embodiments, NMC 101 might include one or more of a number of support objects (not explicitly depicted in the drawings) as described herein to provide functions for NMS 102 to process requests from network manager client 110. A front end object is adapted to receive and re-distribute NMC commands from network manager client 110 to other objects of NMS 102. The front end object can serve as the entry point for NMC requests from network manager client 110 to NMS 102. A network object handler is adapted to track which network entry objects 140 have been created and to ensure that only one instance of a network entry object 140 is created per execution thread. In the preferred embodiment, network manager client 102 will utilize multithreaded processing. Each execution thread will support a session with one network manager client 110. In the presently preferred embodiment, 15 (or fewer) execution threads (i.e., clients) can be supported by each NMS 102. The network object handler ensures that only one instance of a network entry object 140 is created per execution thread. In one embodiment, verifying the uniqueness of each network entry object 140 is accomplished by establishing a network entry object identification for each newly created network entry object 140 and maintaining the identifications on a directory server. The network object handler uses the network entry object identifications to ensure that each network entry object is unique. In addition to network object handler, each product managed by NMC 101 will include its own product object handler. Examples of such product handlers for communication network 100 include a PBX object handler, a phone mail object handler, and a telephony internet service. Similar to the network object handler, the product object handler will track instances of product entry objects 150. In one embodiment, the product entry object identifications will include an internal, product specific identification in combination with a system/node identification. A PBX entry object, as an example, might include in its product entry object identification a PBX identification, a phone product identification, and a station number. The product entry object handler will ensure the all non-static objects are removed after completion of a configuration request. Additional examples of support objects in NMC 101 may include an LDAP interface object that includes all LDAP specific details for accessing a directory server application and an administration object that facilitates, as examples, saving and getting customer template files, issuing requests for full or partial uploads from individual products, and uploading and download batch files.

With reference again to FIG. 1, one embodiment of communication network 100 as indicated above, will include a directory server 200. The use of directory server 200 frees NMC 101 to function without requiring a complete upload of the database of each system being managed by NMC 101. Instead, NMS 102 requires only a subset of database information sufficient to determine the location of each object within the domain. An exemplary directory server application includes Directory Server 3.0 (or later) from Netscape Communications Corporation, Mountain View, Calif. In one embodiment, each product managed by NMC 101 will include its own bridge suitable for uploading data to directory server 200. In the preferred embodiment, directory server 200 and each bridge application are LDAP compliant. The bridge applications are adapted for retrieving data from their respective systems and updating directory server 200.

Figure 6:
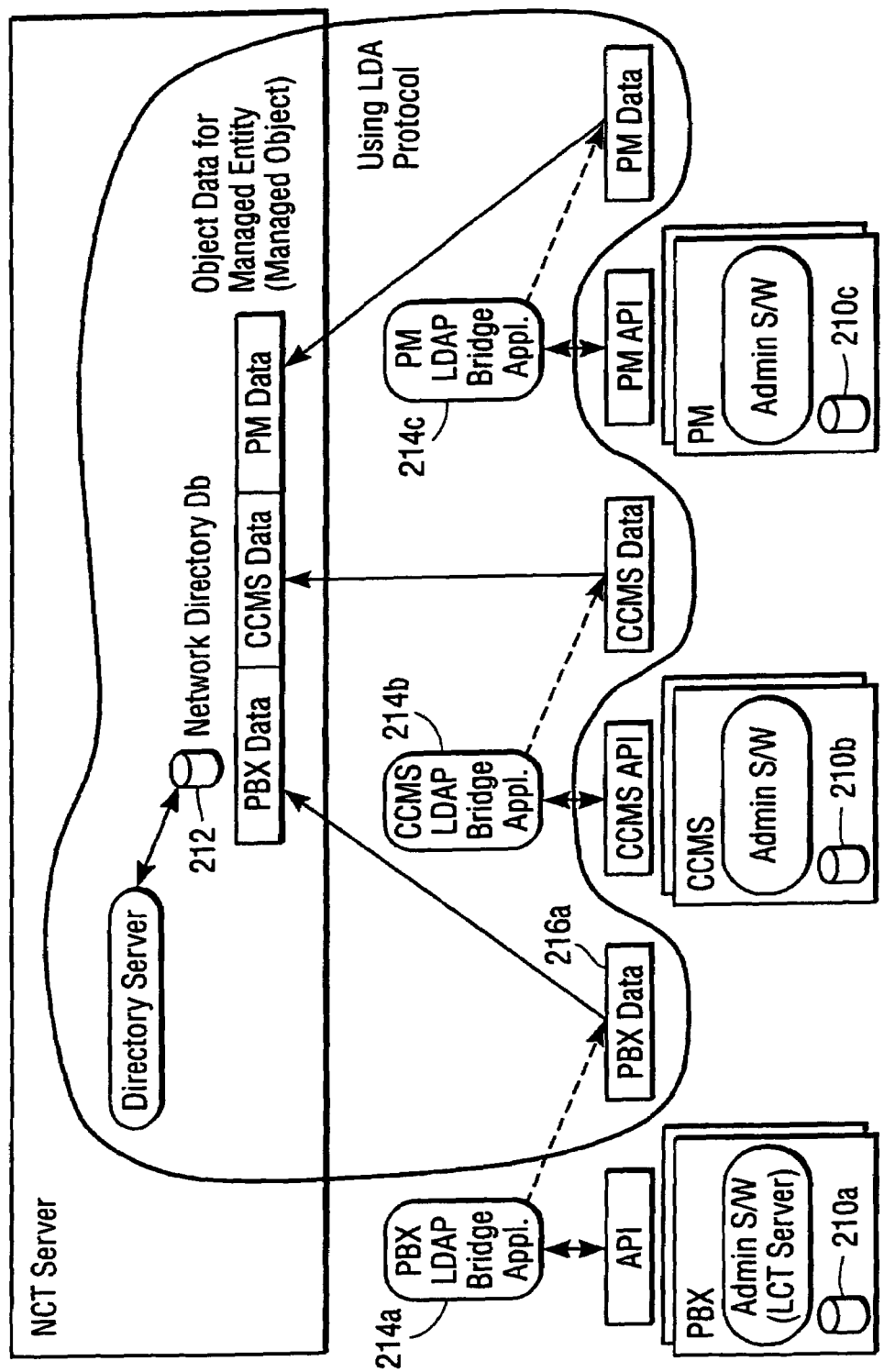
FIG. 6 is a representation of an embodiment of the network manager server of the invention emphasizing a directory server network database structure.

Directory server 200 will be organized according to the configuration model of NMC 101. In the example presented earlier in which a person object includes a PBX object and a phone mail object, relevant PBX object data is transferred to directory server 200 via a PBX bridge application. The data uploaded to directory server 200 may include, as examples, a PBX identifier, a voice station number, a port equipment number, a data station number, a phone type, location code, the person's name, and the person's department name. Similarly, a phone mail bridge application uploads relevant information to directory server 200 including the phone mail system identifier, a mail box name, and an extension number. The records for each person may be stored under the person's name and department name such that the person may be located by either one. FIG. 6 is a conceptualized diagram of communication network 100 emphasizing the relationship between the individual product databases indicated by reference numerals 210*a*, 210*b*, and 210*c* and the network database 212. Each product uploads data from its corresponding product database 210 to network database 212 via a corresponding bridge application 214. For example, PBX data is uploaded from PBX database 210*a* to network database 212 via PBX bridge application 214*a*. In the depicted embodiment, The PBX data 216*a* uploaded to network database 212 comprises only the portion of PBX database 210*a* necessary to enable NMS 102 to be able to locate the appropriate data. Each bridge application 214 is adapted to fully or partially upload relevant data from local configuration management software and to regularly the network database with new data at a frequency defined by NMC 101. In addition to person objects, network managed objects in the preferred embodiment may include node type objects. Systems and nodes in the managed domain are identified in the preferred embodiment as network entry objets 140. The physical or logical relationships between the systems and nodes of the network 100 are specified by users when the system or node is created in the domain and stored in directory server 200. NMS 102 will then utilize the relationship information to determine the network actions for a configuration change on the network entry objects 140. One embodiment of NMC 101 is adapted to support multiple physical site components as well as single physical site or co-located systems.

What is claimed is:

1. A communication network, comprising:
    at least one instance of a first object type associated with a first product of the communication network;
    at least one instance of a second object type associated with a second product of the communication network;
    first local means for configuring each instance of the first object type;
    second local means for configuring each instance of the second object type;
    a network management server comprising a product specific coordinator including means for coordinating configuration activities among each instance of the first object type via the first local means and means for coordinating configuration activities among each instance of the second object type via the second local means and further comprising a network coordinator adapted for configuring each instance of a network object comprising a first component associated with the first object type and a second component associated with the second object type; and
    a network management client including a graphical user interface adapted for enabling a user to invoke the network management server;
    wherein network managed objects define network entry objects representing components residing in one or more nodes and resource objects defined by a plurality of endpoints and product entry objects representing local objects presented to network entry objects and those not associated with network entry objects.

2. The communication network of claim 1, wherein the first object type comprises a phone mail object and the first local means comprises a phone mail server process.

3. The communication network of claim 1, wherein the second object type comprises a PBX object and the second local means comprises a PBX server process.

4. The communication network of claim 1, further comprising a CORBA compliant interface between the product specific coordinator and the first local means.

5. The communication network of claim 1, wherein the network coordinator includes means for accessing network object data from a directory server.

6. The communication network of claim 5, wherein the directory server is LDAP compliant.

7. The communication network of claim 5, further comprising a first LDAP compliant bridge for uploading first object type data from each instance of the first object type to the directory server and a second LDAP compliant bridge application for uploading second object type data from each instance of the second object type to the directory server.

8. The communication network of claim 1, wherein the network management client includes a CORBA compliant interface to the network management server.

9. The communication network of claim 1, wherein the network object is a person object comprising a phone mail object component and a PBX object component.

10. The communication network of claim 1, wherein the network object comprises a resource object including a first end point address and a second end point address.

11. The communication network of claim 10, wherein the first and second end point addresses reside in different instances of the first object type.

12. The communication network of claim 10, wherein the first end point address resides in an instance of the first object type and the second end point address resides in an instance of the second object type.

13. A communication network manager, comprising:
    a network management server including a product specific coordinator comprising means for coordinating configuration activities among each instance of a first object type via first local configuration means and means for coordinating configuration activities among each instance of a second object type via second local means, and further comprising a network coordinator adapted for configuring each instance of a network object comprising a first component associated with the first object type and a second component associated with the second object wherein network managed objects define network entry objects representing components residing in one or more nodes and resource objects defined by a plurality of endpoints and product entry objects representing local objects presented to network entry objects and those not associated with network entry objects; and
    a network management client suitable for enabling a user to invoke the network management server.

14. The network manager of claim 13, wherein the first object type comprises a phone mail object and the first local means comprises a phone mail server process.

15. The network manager of claim 13, wherein the second object type comprises a PBX object and the second local means comprises a PBX server process.

16. The network manager of claim 13, further comprising a CORBA compliant interface between the product specific coordinator and the first local means.

17. The network manager of claim 13, wherein the network coordinator includes means for accessing network object data from a directory server.

18. The network manager of claim 17, wherein the directory server is LDAP compliant.

19. The network manager of claim 17, further comprising a first LDAP compliant bridge for uploading first object type data from each instance of the first object type to the directory server and a second LDAP compliant bridge application for uploading second object type data from each instance of the second object type to the directory server.

20. The network manager of claim 13, wherein the network object is a person object comprising a phone mail object component and a PBX object component.

21. The network manager of claim 13, wherein the network object comprises a resource object including a first end point address and a second end point address.

22. The network manager of claim 21, wherein the first and second end point addresses reside in different instances of the first object type.

23. The network manager of claim 21, wherein the first end point address resides in an instance of the first object type and the second end point address resides in an instance of the second object type.

24. A method of managing a communication network, comprising:
  identifying the components of a network object in response to a network configuration request in response to a network configuration request from a network management server;
  invoking a first local configuration application to configure a first component of the network object; and
  invoking a second local configuration application to configure a second component of the network object;
  wherein network managed objects define network entry objects representing components residing in one or more nodes and resource objects defined by a plurality of endpoints and product entry objects representing local objects presented to network entry objects and those not associated with network entry objects.

25. The method of claim 24, wherein the step of identifying the components comprises accessing object data from an LDAP compliant directory server.

26. The method of claim 24, wherein the configuring of the first component comprises configuring a PBX object of the communication network.

27. The method of claim 26, wherein the step of configuring the first component comprises taking an action selected from the group comprising removing, adding, and changing the first component.

28. The method of claim 24, wherein the configuring of the second component comprises configuring a phone mail object of the communication network.

29. The method of claim 28, wherein the step of configuring the second component comprises taking an action selected from the group comprising removing, adding, and changing the second component.

30. A communication network, comprising:
  first local configuration modules;
  second local configuration modules;
  a network management server including:
    a network coordinator configured to coordinate each instance of a network object, the network object comprising a first component associated with a first object type and a second component associated with a second object type, the first and second object type associated with the first and second local configuration modules;
    a product specific coordinator configured to coordinate configuration activities among instances of the first object type and the second object type;
  wherein said network management server is configured to coordinate said network object by identifying said first and second components, identifying associated first and second object types and invoking associated first and second local configuration modules at locations where said first and second object types are identified wherein network managed objects define network entry objects representing components residing in one or more nodes and resource objects defined by a plurality of endpoints and product entry objects representing local objects presented to network entry objects and those not associated with network entry objects.

31. A communication network in accordance with claim 30, wherein said network object comprises a person object and said first component is a PBX component and said second component is a phone mail component.

32. A communication network in accordance with claim 30, wherein said network object comprises identifies a plurality of components associated with said network object.

33. The communication network of claim 30, wherein the first object type comprises a phone mail object and the first local means comprises a phone mail server process.

34. The communication network of claim 30, wherein the second object type comprises a PBX object and the second local means comprises a PBX server process.

35. A telecommunication network configuration method, comprising:
  specifying a network object, the network object including components associated with a plurality of local objects;
  identifying which local objects are associated with said network object; and
  invoking local configuration modules coordinated from a network management configuration module associated with said local objects to configure said network object.

36. A communication network, comprising:
  at least one instance of a first object type associated with a first product of the communication network;
  at least one instance of a second object type associated with a second product of the communication network;
  first local means for configuring each instance of the first object type;
  second local means for configuring each instance of the second object type;
  a network management server comprising a product specific coordinator including means for coordinating configuration activities among each instance of the first object type via the first local means and means for coordinating configuration activities among each instance of the second object type via the second local means and further comprising a network coordinator adapted for configuring each instance of a network object comprising a first component associated with the first object type and a second component associated with the second object type.

37. A communication network manager, comprising:
  a network management server including a product specific coordinator comprising means for coordinating configuration activities among each instance of a first object type via first local configuration means and means for coordinating configuration activities among each instance of a second object type via second local means, and further comprising a network coordinator adapted for configuring each instance of a network object comprising a first component associated with the first object type and a second component associated with the second object; and a network management client suitable for enabling a user to invoke the network management server.

38. A method of managing a communication network, comprising:
  identifying the components of a network object in response to a network configuration request from a network management server;
  invoking a first local configuration application to configure a first component of the network object; and
  invoking a second local configuration application to configure a second component of the network object.

39. A communication network, comprising:
  first local configuration modules;
  second local configuration modules;
  a network management server including:
    a network coordinator configured to coordinate each instance of a network object, the network object comprising a first component associated with a first object type and a second component associated with a second object type, the first and second object type associated with the first and second local configuration modules;
    a product specific coordinator configured to coordinate configuration
  activities among instances of the first object type and the second object type;
  wherein said network management server is configured to coordinate said network object by identifying said first and second components, identifying associated first and second object types and invoking associated first and second local configuration modules at locations where said first and second object types are identified.

\* \* \* \* \*